United States Patent
Vivanco et al.

(10) Patent No.: US 8,700,059 B1
(45) Date of Patent: Apr. 15, 2014

(54) SELECTING A CARRIER

(75) Inventors: Daniel Vivanco, Sterling, VA (US);
Krishna Sitaram, Chantilly, VA (US)

(73) Assignee: Sprint Spectrum L.P., Overland Park, KS (US)

(*) Notice: Subject to any disclaimer, the term of this patent is extended or adjusted under 35 U.S.C. 154(b) by 38 days.

(21) Appl. No.: 13/456,696

(22) Filed: Apr. 26, 2012

(51) Int. Cl.
*H04W 4/00* (2009.01)

(52) U.S. Cl.
USPC .............. 455/456.1; 455/453; 455/435.2

(58) Field of Classification Search
USPC ........ 455/456.1, 453, 452.1, 435.2, 436–444; 370/331–332
See application file for complete search history.

(56) References Cited

U.S. PATENT DOCUMENTS

| | | | |
|---|---|---|---|
| 2006/0128392 A1* | 6/2006 | Turina et al. | 455/452.1 |
| 2011/0105155 A1 | 5/2011 | Bienas et al. | |
| 2011/0269447 A1 | 11/2011 | Bienas et al. | |
| 2011/0306363 A1* | 12/2011 | Wang et al. | 455/456.1 |
| 2012/0034922 A1* | 2/2012 | Jones et al. | 455/438 |

* cited by examiner

*Primary Examiner* — Kamran Afshar
*Assistant Examiner* — Farideh Madani

(57) ABSTRACT

In systems and methods of selecting a carrier, tracking area update messages for a wireless device communicating over a first carrier are monitored to determine that a number of tracking update messages meets a traffic threshold. A first tracking area configuration for the first carrier and a second tracking area configuration for a second carrier are determined, and a location and a mobility of the wireless device relative to the first tracking area configuration and the second tracking area configuration are ascertained. Based on the first tracking area configuration, the second tracking area configuration, the determined location, and the determined mobility a handover of the wireless device from the first carrier to the second carrier is performed.

14 Claims, 7 Drawing Sheets

SELECTING A CARRIER

TECHNICAL BACKGROUND

A wireless device can enter into a lower power state, such as an idle mode or a sleep mode, in which the wireless device is not in continuous communication with an access node. A communication system maintains a record of a recent location of the wireless device in an idle state in order to route paging messages to the wireless device if data is sent to the wireless device. One method of maintaining a record of a recent location of a wireless device is by use of a tracking area. A tracking area comprises a group of access nodes which are associated with a tracking area code. When a message such as data arrives for a wireless device in an idle mode, a first paging message is sent to the access node most recently in communication with the wireless device. When the wireless device does not respond to the first paging message within a predetermined period of time, a second paging message is sent to all of the access nodes in the tracking area.

OVERVIEW

In an embodiment, tracking area update messages for a wireless device communicating over a first carrier are monitored to determine that a number of tracking update messages meets a traffic threshold. A first tracking area configuration for the first carrier and a second tracking area configuration for a second carrier are determined, and a location and a mobility of the wireless device relative to the first tracking area configuration and the second tracking area configuration are ascertained. Based on the first tracking area configuration, the second tracking area configuration, the determined location, and the determined mobility a handover of the wireless device from the first carrier to the second carrier is performed.

DETAILED DESCRIPTION

In systems and method of selecting a carrier, tracking area update messages for a wireless device communicating over a first carrier are monitored to determine that a number of tracking update messages meets a traffic threshold. A first tracking area configuration for the first carrier and a second tracking area configuration for a second carrier are determined. A location and a mobility of the wireless device relative to the first tracking area configuration and the second tracking area configuration are ascertained. Based on the first tracking area configuration, the second tracking area configuration, the determined location, and the determined mobility a handover of the wireless device from the first carrier to the second carrier is performed. In an embodiment, based on a determination that the wireless device can communicate over the first carrier and the second carrier, the first tracking area configuration is determined for the first carrier and the second tracking area configuration is determined for the second carrier.

Figure 1:
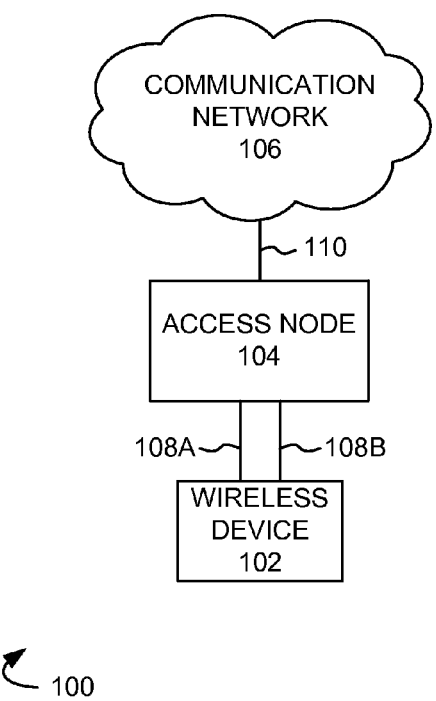
FIG. 1 illustrates an exemplary communication system to select a carrier.

FIG. 1 illustrates an exemplary communication system 100 to select a carrier comprising wireless device 102, access node 104, and communication network 106. Examples of wireless device 102 can include a cell phone, a smart phone, a computing platform such as a laptop, palmtop, or tablet, a personal digital assistant, or an internet access device, including combinations thereof. Wireless device 102 can communicate with access node 104 over communication links 108A and 108B.

Access node 104 is a network node capable of providing wireless communications to wireless device 102, and can be, for example, a base transceiver station, a radio base station, an eNodeB device, or an enhanced eNodeB device. Communication links 108A and 108B can be, for example, a first carrier and a second carrier, over which access node 104 and wireless device 102 can communicate. Access node 104 is also in communication with communication network 106 over communication link 110.

Communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 may also comprise base stations, wireless communication nodes, telephony switches, internet routers, network gateways, computer systems, communication links, or some other type of communication equipment, and combinations thereof. Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Communication links 108A, 108B and 110 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104 and communication network 106 which are omitted for clarity, including additional processing nodes, routers, gateways, and physical and/or wireless data links for carrying data among the various network elements.

In an embodiment, tracking area update messages for wireless device 102 communicating over a first carrier 108A are monitored to determine that a number of tracking update messages meets a traffic threshold. A first tracking area configuration for the first carrier 108A and a second tracking area configuration for a second carrier 108B are determined, and a location and a mobility of wireless device 102 relative to the first tracking area configuration and the second tracking area configuration are ascertained. Based on the first tracking area configuration, the second tracking area configuration, the determined location, and the determined mobility a handover of wireless device 102 from first carrier 108A to second carrier 108B is performed A wireless device such as wireless device 102 can enter into a lower power state, such as an idle mode or a sleep mode, in which wireless device 102 is not in continuous communication with access node 104. Nevertheless, communication system 100 maintains a record of a recent location of wireless device 102 in order to route paging messages to wireless device 102, for example, if data is sent to wireless device 102. One method of maintaining a record of a recent location of wireless device 102 is by use of a tracking area. A tracking area consists of a group of access nodes which are associated with a tracking area code. In an embodiment, communication network 100 maintains a record of the access node that wireless device 102 communicated with most recently, as well as the associated tracking area code, and thus the associated tracking area, of that access node. Wireless device 102 can be considered to be within the tracking area associated with the most recent access node. When a message such as data arrives for wireless device 102, a paging message is sent to the access node most recently in communication with wireless device 102. When wireless device 102 does not respond to the paging message within a predetermined period of time, a paging message is sent to the access nodes in the tracking area.

Figure 2:
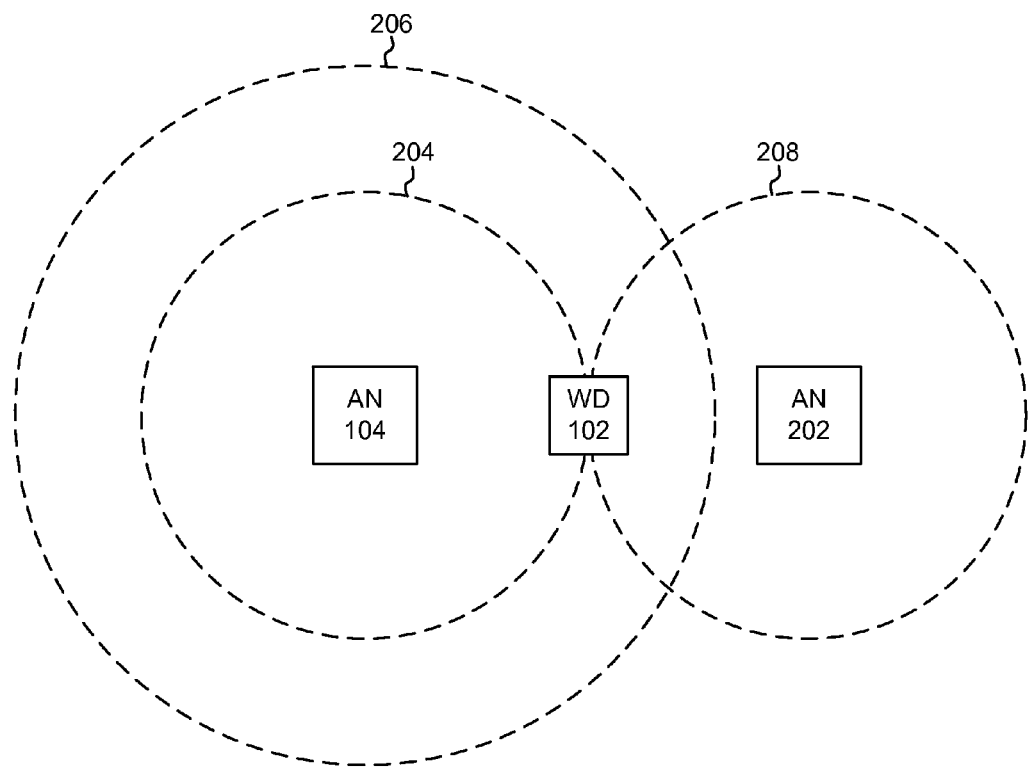
FIG. 2 illustrates exemplary tracking area configurations.

Typically, when a wireless device moves from a first tracking area to a second tracking area, the wireless device sends a tracking area update (TAU) message to update communication system 100 of its new location. Referring to FIG. 2, when, for example, wireless device 102 moves from tracking area 204 to tracking area 208 (for example, if wireless device 102 is handed over from access node 104 associated with tracking area 204 to access node 202 associated with tracking area 208), then wireless device 102 will send a TAU to communication system 100 through access node 202. If wireless device 102 enters an idle mode subsequent to its handover to access node 202, when a message arrives for wireless device 102 communication system 100 can use the tracking area code of tracking area 208 to route a paging message to wireless device 102. (While two access nodes 104 and 202 are illustrated in FIG. 2 for simplicity, it will be understood that a tracking area typically comprises a plurality of access nodes. In addition, while tracking areas in FIG. 2 are illustrated as circular, it will be understood that this is merely an illustration for simplicity of explanation and that tracking areas and tracking area configurations may vary according to numerous factors, including variations in geography and network topology.)

In a communication system which uses a plurality of carriers, different tracking area configurations may be associated with different carriers. For example, tracking areas 204 and 208 may be associated with a first carrier, and tracking area 206 may be associated with a second carrier. Tracking area configuration can affect a volume of TAUs in communication network 100. For example, when wireless device 102 is mobile and using the first carrier, given the size of tracking areas 204 and 208, wireless device 102 will send TAUs more frequently as it moves among tracking areas 204 and 208 associated with the first carrier. As another example, when wireless device 102 is relatively stationary in a border region (for example, at the edges) of two tracking areas 204 and 208, it may be determined that wireless device 102 is moving repeatedly between the two tracking areas, and wireless device 102 will send a TAU each time it is determined to move to a new tracking area. As the number of wireless devices in communication with communication system 100 increase, TAU message volume can increase, especially if the wireless devices are highly mobile, or if they are in or near a border region of two or more tracking areas. As the volume of TAU increases, uplink congestion in both air interfaces and the communication network may result, as well as an increase in call controller processing. Additionally, the more TAUs a wireless device is required to send, the greater the drain on its battery. If wireless device 102 were to change from using the first carrier, associated with tracking areas 204 and 208, to using the second carrier, associated with tracking area 206, wireless device 102 would be required to send fewer TAUs.

Figure 3:
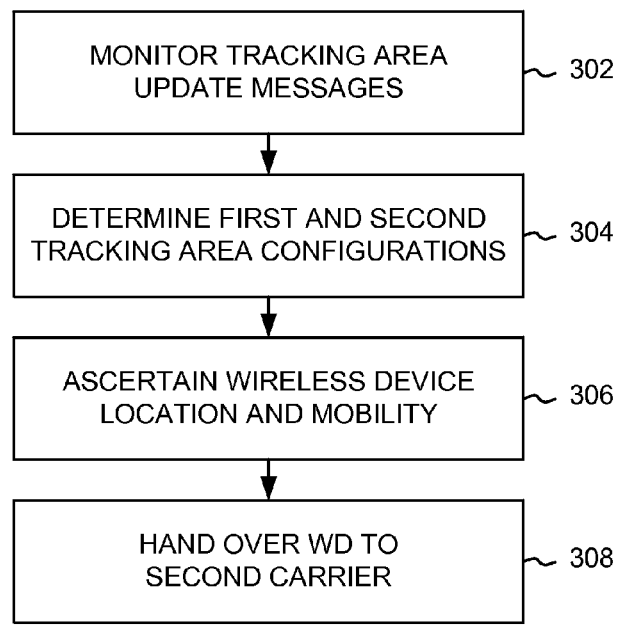
FIG. 3 illustrates an exemplary method of selecting a carrier.

FIG. 3 illustrates an exemplary method of selecting a carrier. In operation 302, tracking area update messages are monitored to determine that a number of tracking area update messages meets a traffic threshold. For example, TAUs sent by wireless device 102 can be monitored, and it can be determined that the number of TAUs sent by wireless device 102 meet a traffic threshold. This can be, for example, because wireless device 102 is using a first carrier associated with tracking areas 204 and 208 and is highly mobile, or because wireless device 102 is located near the border area between tracking areas 204 and 208.

In operation 304, a first tracking area configuration for the first carrier and a second tracking area configuration for a second carrier are determined. For example, a configuration of tracking areas 204 and 208 can be determined as the first tracking area configuration, and further a tracking area configuration of tracking area 206 (and other tracking areas) associated with a second carrier can also be determined.

In operation 306, a location and a mobility of the wireless device relative to the first tracking area configuration and the second tracking area configuration can be ascertained. For example, the location of wireless device 102 can be determined to be near the border region of tracking areas 204 and 208, and a mobility of wireless device 102 can be determined to be relatively stationary near the border region. The location of wireless device 102 can also be determined to be within, and not near a border of, tracking area 206. As another example, a mobility of wireless device 102 can also be determined to indicate that wireless device 102 is mobile. Such mobility can indicate, for example, that when wireless device 102 uses the first carrier, wireless device 102 will be required to send more TAUs than if wireless device were using the second carrier (associated with tracking area 206). In operation 308, based on the first tracking area configuration, the second tracking area configuration, the determined location, and the determined mobility, a handover is performed to hand over the wireless device from the first carrier to the second carrier. For example, wireless device 102 can be handed over from the first carrier associated with tracking areas 204 and 208 to the second carrier associated with tracking area 206.

Figure 4:
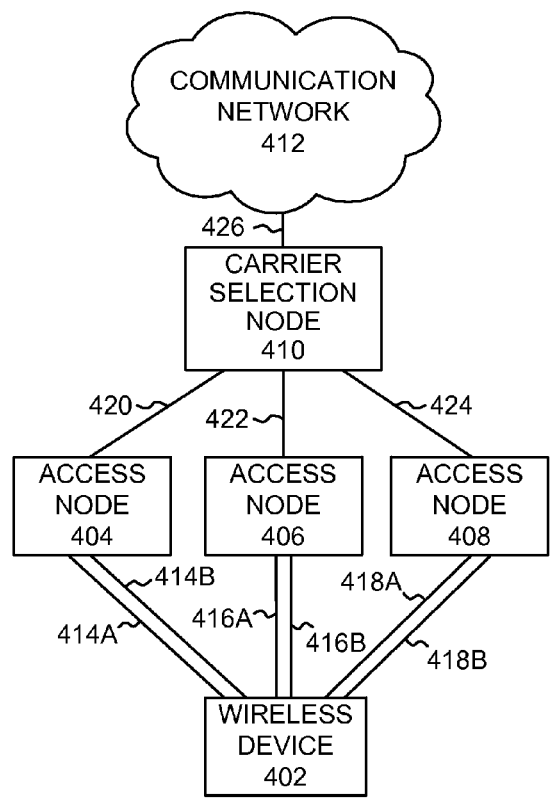
FIG. 4 illustrates another exemplary communication system to select a carrier.

FIG. 4 illustrates another exemplary communication system 400 to select a carrier comprising wireless device 402, access nodes 404, 406 and 408, carrier selection node 410, and communication network 412. Examples of wireless device 402 can include a cell phone, a smart phone, a computing platform such as a laptop, palmtop, or tablet, a personal digital assistant, or an internet access device, including combinations thereof.

Access nodes 404, 406 and 408 are network nodes capable of providing wireless communications to wireless device 402, and can be, for example, a base transceiver station, a radio base station, an eNodeB device, or an enhanced eNodeB device. Communication links 414A, 416A, and 418A can be, for example, a first carrier, and communication links 414B, 416B, and 418B can be, for example, a second carrier. Wireless device 402 can communicate with access nodes 404, 406 and 408 over communication links 414 A and 414B, 426A and 416B, and 418A and 418B, respectively. Access nodes 404, 406, and 408 are also in communication with carrier selection node 410 over communication links 420, 422 and 424.

Carrier selection node 410 is a processing node configured to select a carrier over which wireless device 402 can communicate with access nodes 404, 406, and/or 408. Carrier selection node 410 can comprise a processor and associated circuitry to execute or direct the execution of computer-readable instructions for managing content, and can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Carrier selection node 410 can communicate with communication network 412 over communication link 426. Examples of carrier selection node can include, for example, a mobility management entity (MME), a serving gateway (S-GW), a mobile switching center (MSC), or other similar network node. The functionality of carrier selection node 410 can also be incorporated into a network node such as one of the aforementioned network nodes or another network node.

Communication network 412 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 412 may also comprise base stations, wireless communication nodes, telephony switches, internet routers, network gateways, computer systems, communication links, or some other type of communication equipment, and combinations thereof. Communication network 412 can use wired and/or wireless network protocols analogous to communication network 106.

Communication links 414A, 414B, 416A, 416B, 418A, 418B, 420, 422, 424 and 426 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access nodes 404, 406 and 408, carrier selection node 410, and communication network 412 which are omitted for clarity, including additional processing nodes, routers, gateways, and physical and/or wireless data links for carrying data among the various network elements.

Figure 5:
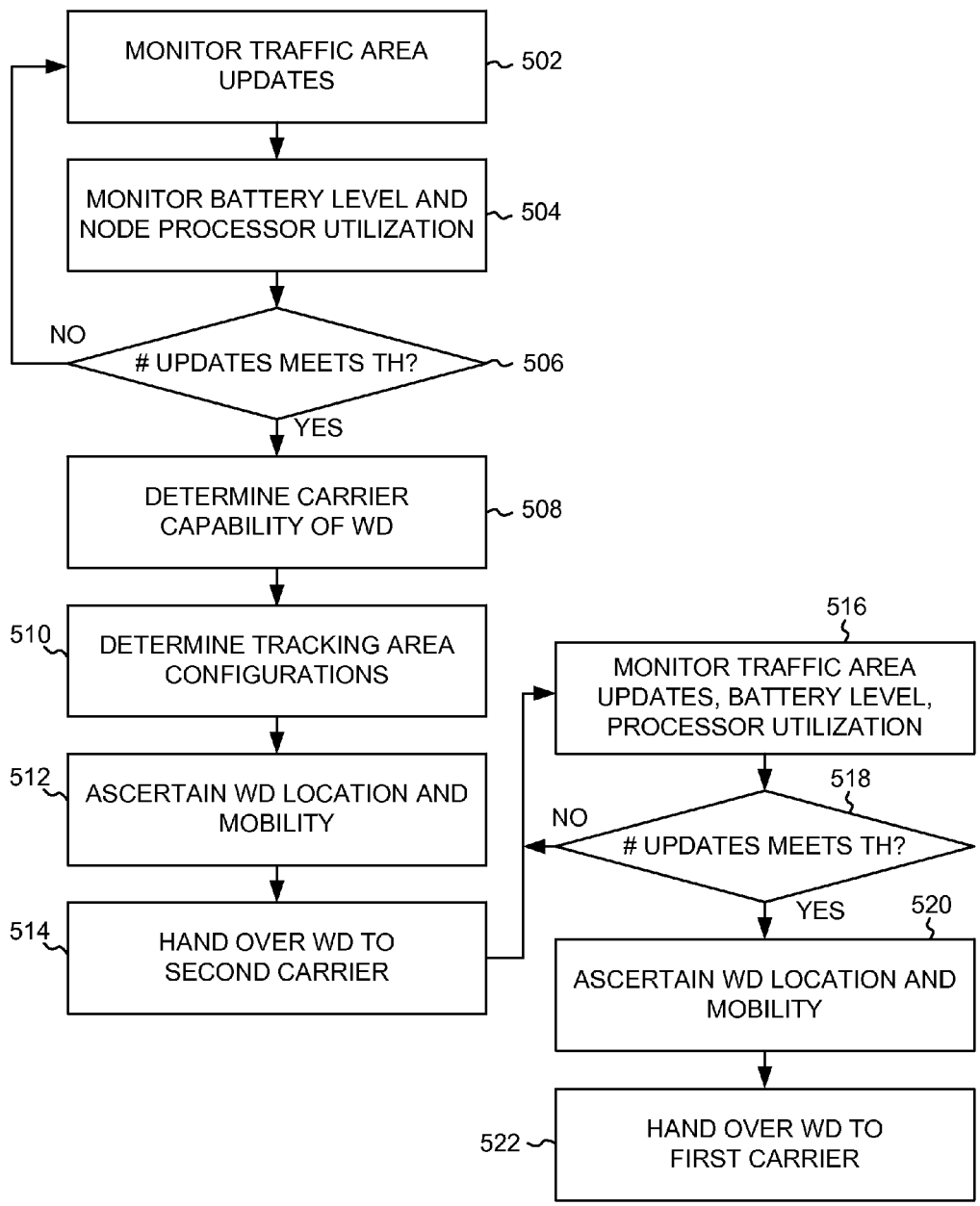
FIG. 5 illustrates another exemplary method of selecting a carrier.
Figure 6:
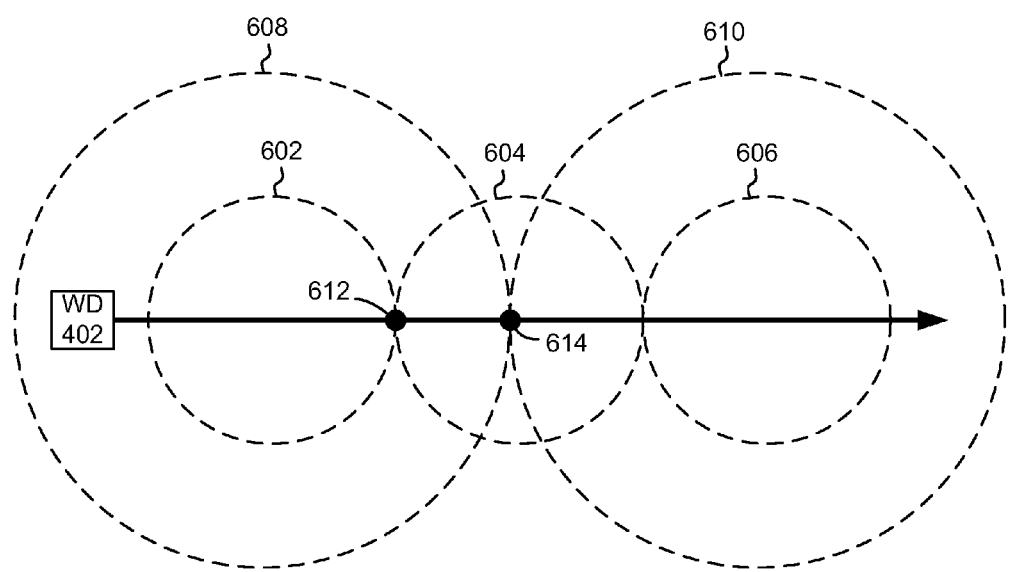
FIG. 6 illustrates additional exemplary tracking area configurations.

FIG. 5 illustrates another exemplary method of selecting a carrier. In operation 502, tracking area update messages for a wireless device communicating over a first carrier are monitored to determine that a number of tracking update messages meets a traffic threshold. For example, wireless device 402 may move from a first tracking area associated with access node 404 to a second tracking area associated with access node 406. Referring to FIG. 6, as an example, when wireless device 302 moves from tracking area 602 to tracking area 604, wireless device 302 sends a TAU to communication system 400.

Returning to FIG. 5, in operation 504, a battery level of wireless device 402 and a node processor utilization level of a processing node are monitored. For example, a battery level of wireless device 402 can be monitored to determine whether it meets a battery threshold. Additionally, or alternatively, a processor of a processing node, such as an MME or other node in communication network 412, or of carrier selection node 410, can be monitored to determine if the processor utilization level meets a processor utilization threshold. The battery level of wireless device 402 and the node processor utilization level can provide an indication of a number of TAUs in communication system 400. The battery level of wireless device 402, for example, can be drained more rapidly when wireless device 402 sends frequent TAUs. Similarly, the processor utilization level of a processing node can increase as the number of TAUs in communication system 400 increases.

In operation 506, it is determined whether a number of tracking area update messages meets a traffic threshold. The battery level of wireless device 402 and/or the node processor utilization level can also be used in the determination of whether a number of TAUs meets a traffic threshold. That is, in an embodiment the determined number of TAUs and the traffic threshold can also take into account not only a number of TAUs, but also the battery level of wireless device 402 and/or the node processor utilization level. In an embodiment, the number of TAUs and the battery levels of a plurality of wireless devices in communication with access node 404, 406 and/or 408 are monitored.

When the number of TAUs does not meet the traffic threshold (operation 506-NO) then monitoring of TAUs is continued. When the number of traffic area updates meets the traffic threshold (operation 506-YES), the carrier capabilities of wireless device 402 are determined. For example, it can be determined that wireless device 402 can use a first carrier (used by communication links 414A, 416A, and 418A, for example) and a second carrier (used, for example, by communication links 414B, 416B, and 418B).

Based on the determined carrier capabilities of wireless device 402, tracking area configurations of the carriers are determined (operation 510). For example, when wireless device 402 can use a first carrier and a second carrier, tracking area configurations associated with the first carrier and the second carrier can be determined. For example, tracking areas 602, 604 and 606 illustrated in FIG. 6 can be associated with the first carrier, and tracking areas 608 and 610 can be associated with the second carrier. Further, the configurations of these tracking areas, illustrated in FIG. 6, can be determined based at least in part on the determined carrier capabilities of wireless device 402. While tracking areas in FIG. 6 are illustrated as circular, it will be understood that this is merely an illustration for simplicity of explanation and that tracking areas and tracking area configurations may vary according to numerous factors, including variations in geography and network topology.

Returning to FIG. 5, in operation 512 a location and a mobility of the wireless device can be ascertained. The location and the mobility of the wireless device can be determined, for example, based on GPS information obtained by wireless device 402, or it can be obtained by access node triangulation of the location and mobility of wireless device 402. The location and the mobility of the wireless device can be ascertained relative to the first tracking area configuration and the second tracking area configuration. For example, the location of wireless device 402 can be determined to be near the border region between tracking areas 602 and 604 (FIG. 6) which are associated with the first carrier, such as location 612. Similarly, the location of wireless device 402 can be determined to be near the border region between tracking areas 608 and 610 which are associated with the second carrier, such as location 614. Additionally, a mobility of wireless device 402 can be determined. For example, wireless device 402 can be determined to be relatively stationary in a border region at location 612, or at location 614. A mobility of wireless device 402 can also be determined to indicate that wireless device 402 is mobile. Such mobility can indicate, for example, that when wireless device 402 uses the first carrier, wireless device 402 will be required to send more TAUs than if wireless device were using the second carrier (associated with tracking areas 608 and 610). While location 612 is near a border region between tracking areas 602 and 604, location 612 is within, and not near an edge of, tracking area 608. In addition, while location 614 is near a border region between tracking areas 608 and 610, location 614 is within, and not near an edge of, tracking area 604.

In operation 514 (FIG. 5), a handover is performed of wireless device 402 from the first carrier to the second carrier based on the first tracking area configuration, the second tracking area configuration, the determined location, and the determined mobility. For example, when it is determined that wireless device 402 can use both the first carrier and the second carrier, that wireless device 402 is at location 612, and that wireless device 402 is relatively stationary at location 612, then a handover can be performed to hand over wireless device 402 from the first carrier to the second carrier.

Thereafter, the number of traffic area updates, the battery level of wireless device 402, and the node processor utilization can be further monitored (operation 516), and it may be determined that a number of TAUs meets a traffic threshold when wireless device 402 is using the second carrier (operation 518). For example, referring to FIG. 6, wireless device 402 may have moved to location 614, which is near a border region of traffic areas 608 and 610, which are associated with the second carrier. Location 614 is also within, and not near an edge of, tracking area 604.

Returning to FIG. 5, when the number of TAUs does not meet a traffic threshold (operation 518-NO), then monitoring of the number of traffic area updates, the battery level of wireless device 402, and the node processor utilization can continue. When the number of TAUs meets a traffic threshold (operation 518-YES), a location and mobility of wireless device 402 can be determined. The location and mobility of the wireless device can be determined relative to the first and second tracking area configurations. For example, the location of wireless device 402 can be determined to be in the border region of traffic areas 608 and 610 (FIG. 6), and within tracking area 604.

In operation 522 (FIG. 5), based on the first tracking area configuration, the second tracking area configuration, the determined location, and the determined mobility, a handover is performed to hand over the wireless device from the second carrier to the first carrier. For example, wireless device 402 can be handed over from the second carrier associated with tracking areas 608 and 610 (FIG. 6) to the second carrier associated with tracking area 604.

Figure 7:
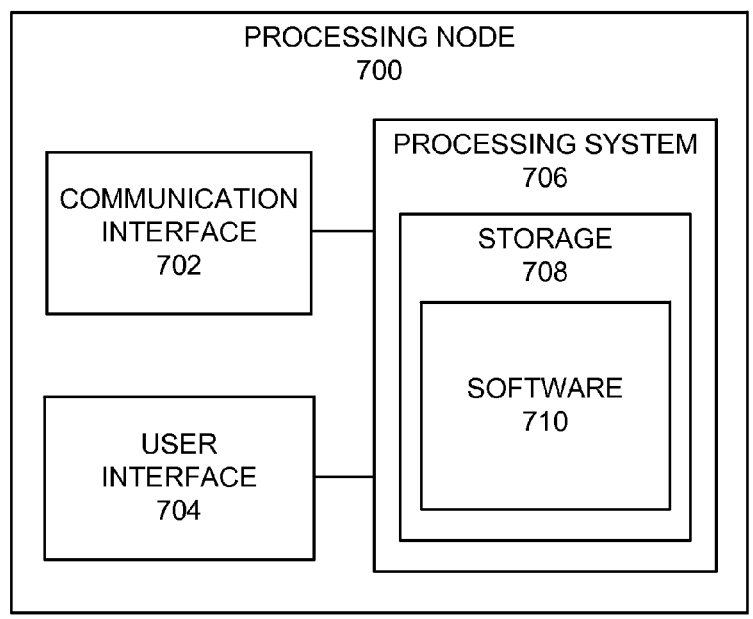
FIG. 7 illustrates an exemplary processing node.

FIG. 7 illustrates an exemplary processing node comprising communication interface 702, user interface 704, and processing system 706 in communication with communication interface 702 and user interface 704. Processing node 700 is capable of selecting a carrier. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

An example of processing node 700 includes carrier selection node 410. Processing node 700 can also be an adjunct or component of a network element, such as an element of access node 104, 404, 406 or 408. Processing node 700 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of selecting a carrier, comprising:
monitoring tracking area update messages for a wireless device communicating over a first carrier and a processor utilization of a carrier selection node; determining that a number of tracking area update messages meets a traffic threshold based on the number of tracking area update messages and the processor utilization of the carrier selection node; determining a first tracking area configuration for the first carrier and a second tracking area configuration for a second carrier; ascertaining a location and a mobility of the wireless device based on the first tracking area configuration and the second tracking area configuration; and performing a handover of the wireless device from the first carrier to the second carrier based on the first tracking area configuration, the second tracking area configuration, the ascertained location, and the ascertained mobility.

2. The method of claim 1, wherein determining a first tracking area configuration further comprises: determining that the wireless device is configured to communicate over the first carrier and the second carrier; and determining a first tracking area configuration for the first carrier and a second tracking area configuration for the second carrier based on the determination that the wireless device is configured to communicate over the first carrier and the second carrier.

3. The method of claim 1, further comprising: monitoring a battery level of the wireless device; and determining that the number of tracking area update messages meets the traffic threshold based on the number of tracking area update messages, the processor utilization of the carrier selection node, and the battery level of the wireless device.

4. The method of claim 1, wherein the first and second tracking area configurations each comprise a geographic location of at least one access node using the first and second carriers, respectively.

5. The method of claim 1, wherein the first and second tracking area configurations each comprise a coverage area indicated by a respective first and second tracking area identity.

6. The method of claim 1, wherein the wireless device is in an idle mode when the wireless device is in communication with the first carrier and the second carrier.

7. The method of claim 1, further comprising: determining that a second number of tracking area update messages meets the traffic threshold based on the second number of tracking area update messages and the processor utilization of the carrier selection node; re-ascertaining the location and the mobility of the wireless device based on the first tracking area configuration and the second tracking area configuration; and performing a handover of the wireless device from the second carrier to the first carrier based on the first tracking area configuration, the second tracking area configuration, the re-ascertained location, and the re-ascertained mobility.

8. A system for selecting a carrier, comprising: a carrier selection node configured to: monitor tracking area update messages for a wireless device communicating over a first carrier and a processor utilization of the carrier selection node; determine that a number of tracking area update messages meets a traffic threshold based on the number of tracking area update messages and the processor utilization of the carrier selection node; determine a first tracking area configuration for the first carrier and a second tracking area configuration for a second carrier; ascertain a location and a mobility of the wireless device based on the first tracking area configuration and the second tracking area configuration; and perform a handover of the wireless device from the first carrier to the second carrier based on the first tracking area configuration, the second tracking area configuration, the ascertained location, and the ascertained mobility.

9. The system of claim 8, wherein the carrier selection node is further configured to: determine that the wireless device is configured to communicate over the first carrier and the second carrier; and determine the first tracking area configuration for the first carrier and the second tracking area configuration for the second carrier based on the determination that the wireless device is configured to communicate over the first carrier and the second carrier.

10. The system of claim 8, wherein the carrier selection node is further configured to: monitor a battery level of the wireless device; and determine that the number of tracking area update messages meets the traffic threshold based on the number of tracking area update messages, the processor utilization of the carrier selection node, and the battery level of the wireless device.

11. The system of claim 8, wherein the first and second tracking area configurations each comprise a geographic location of at least one access node using the first and second carriers, respectively.

12. The system of claim 8, wherein the first and second tracking area configurations each comprise a coverage area indicated by a respective first and second tracking area identity.

13. The system of claim 8, wherein the wireless device is in an idle mode when the wireless device is in communication with the first carrier and the second carrier.

14. The system of claim 8, wherein the carrier selection node is further configured to: determine that a second number of tracking area update messages meets the traffic threshold based on the second number of tracking area update messages and the processor utilization of the carrier selection node;
re-ascertain the location and the mobility of the wireless device based on the first tracking area configuration and the second tracking area configuration; and
perform a handover of the wireless device from the second carrier to the first carrier based on the first tracking area configuration, the second tracking area configuration, the re-ascertained location, and the re-ascertained mobility.

* * * * *